United States Patent [19]

Wallis, Jr. et al.

[11] 4,016,942
[45] Apr. 12, 1977

[54] METHOD AND APPARATUS FOR INDICATING THE POSITION OF ONE WELL BORE WITH RESPECT TO A SECOND WELL BORE

[75] Inventors: David E. Wallis, Jr., Glendale; Robert G. Polansky, La Canada; Peter R. Rahm, Pasadena, all of Calif.

[73] Assignee: Trunkline Gas Company, Houston, Tex.

[22] Filed: Dec. 28, 1973

[21] Appl. No.: 429,189

Related U.S. Application Data

[63] Continuation-in-part of Ser. No. 261,415, June 10, 1972, abandoned.

[52] U.S. Cl. .................................. 175/45; 175/62; 340/18 P; 175/404; 181/101
[51] Int. Cl.² .................................................. E21B 47/12
[58] Field of Search ................ 175/40, 45, 61, 62, 175/41, 72, 73; 181/101, 102, 104; 340/18 NC, 18 ND, 18 P

[56] References Cited

UNITED STATES PATENTS

| 3,160,850 | 12/1964 | Dudley | 166/.5 X |
|---|---|---|---|
| 3,282,355 | 11/1966 | Henderson | 175/40 X |
| 3,285,350 | 11/1966 | Henderson | 175/40 X |
| 3,518,840 | 7/1970 | Mertz | 175/61 X |
| 3,544,957 | 12/1970 | Smetanin | 175/45 |
| 3,722,605 | 3/1973 | Isham | 175/40 |
| 3,817,345 | 6/1974 | Bailey | 175/40 |

*Primary Examiner*—Price C. Faw, Jr.
*Assistant Examiner*—Richard E. Favreau
*Attorney, Agent, or Firm*—Jennings B. Thompson

[57] ABSTRACT

A compression wave type signal of a selected frequency is transmitted into the ground at the bottom of a well bore being drilled. The signal is picked up by four microphones that are positioned in another well bore. The microphones have a known orientation with respect to the desired course of the well bore being drilled. The phase relationship of the transmitted signal picked up by the microphones is used to indicate at the surface the deviation between the course of the well being drilled and the desired course.

9 Claims, 21 Drawing Figures

METHOD AND APPARATUS FOR INDICATING THE POSITION OF ONE WELL BORE WITH RESPECT TO A SECOND WELL BORE

This is a continuation-in-part of patent application Ser. No. 261,415 filed June 10, 1972, and entitled "METHOD AND APPARATUS FOR INDICATING THE POSITION OF A DEVICE IN ONE WELL BORE WITH RESPECT TO A TARGET AREA IN A SECOND WELL BORE" now abandoned.

This invention relates to directional drilling generally, and in particular to a method of and apparatus for indicating the course of a well bore being drilled to intersect another well bore.

This invention has utility in many applications. It is particularly useful when attempting to drill a second well bore so that it intersects a first well bore that has been previously drilled. One application of the invention, for example, is in the practice of the inventions disclosed in U.S. Pat. No. 3,518,840, entitled "METHOD AND APPARATUS FOR CONNECTING A PIPELINE ACROSS AN OBSTRUCTION", that issued to R. Valentine Mertz on July 7, 1970, and U.S. Pat. No. 3,635,036, entitled "METHOD AND APPARATUS FOR CONNECTING A PIPELINE ACROSS AN OBSTRUCTION", that issued to William Coggin Hooper, Jr. on Jan. 18, 1972, both of which are assigned to the same assignee as is this application.

Both patents are directed to constructing pipeline crossings across or around obstructions, such as large navigable rivers, by drilling well bores under the obstruction from opposite sides and extending the pipeline through the well bores. In the Mertz patent, the well bores need not intersect exactly, but they should come close enough so that communication can be established between the well bores by breaking down the formation material that forms a wall between the two well bores. Obviously, then, the well bores should be fairly close together. In the Hooper patent, it is important that the two well bores intersect, and also that they intersect in such a way that a continuous conduit can extend through the two well bores from one side of the obstruction to the other. In one embodiment of the Hooper patent, the well bores are drilled so that they not only intersect, but do so along substantially the same longitudinal axis.

It is an object of this invention to provide a method of and apparatus for indicating at the surface the position of the bottom of a well bore relative to the course it is desired for it to follow.

It is another object of this invention to provide a method of and apparatus for accurately indicating at the surface the position of a device, such as a drill bit, in one well bore, relative to a line extending from a target area in a second well bore in a known direction, so that the path of the drill bit can be accurately monitored as it drills toward the target area.

It is another object of this invention to provide a method of and apparatus for indicating the position of the bottom of a well bore relative to a desired line of travel of the well bore to a target area in a previously drilled well bore by means of an elastic wave type signal that is transmitted into the ground at the bottom of the well bore.

It is yet another object of this invention to provide a method of and apparatus for indicating the position of the bottom of a well bore relative to a line of known direction extending from a selected target area in a first previously drilled well bore by transmitting a compression or an elastic wave type of signal of preselected frequency into the ground at the bottom of the well bore and measuring the phase relationship of the signal when received by a microphone array in the target area.

It is a further object of this invention to provide such apparatus and method wherein a plurality of microphones are oriented in the target area of one well bore in a known position relative to the desired course of travel of another well bore being drilled to receive a signal of known frequency transmitted into the ground at the bottom of the well bore being drilled to indicate the angle, if any, that the well bore is off the desired course of travel.

It is another object of this invention to provide apparatus for indicating at the surface the orientation of a plurality of microphones in a plane having a known relationship to the desired line of travel of a drill bit in another well bore.

It is another object and feature of this invention to provide an improved signal detector having a plurality of microphones that substantially reduces the likelihood of cross-talk between the microphones.

These and other objects, advantages, and features of this invention will be apparent to those skilled in the art from a consideration of this specification, including the appended claims and attached drawings.

Figure 9A:
Figure 9B:
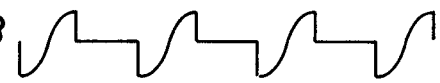
Figure 9C:
Figure 9D:
Figure 10:
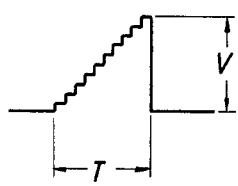
Figure 11:
Figure 12A:
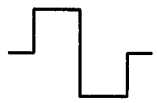
Figure 12B:
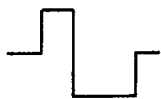
Figures 5, 5A, 5B, 5C:
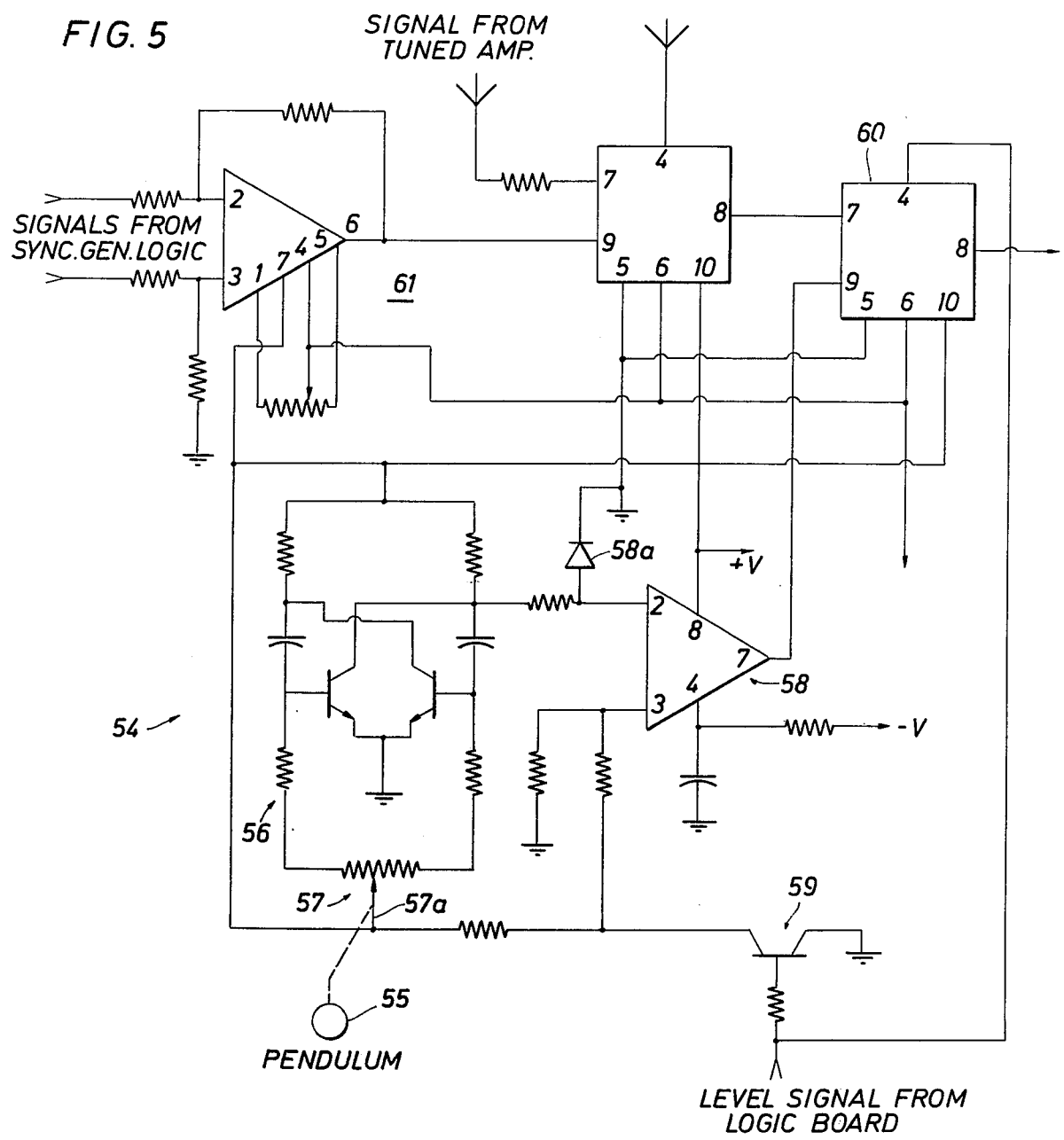
FIG. 5 is a circuit diagram of the portion of the torpedo that provides a signal to the receiver to indicate the orientation of the microphones.
Figure 6:
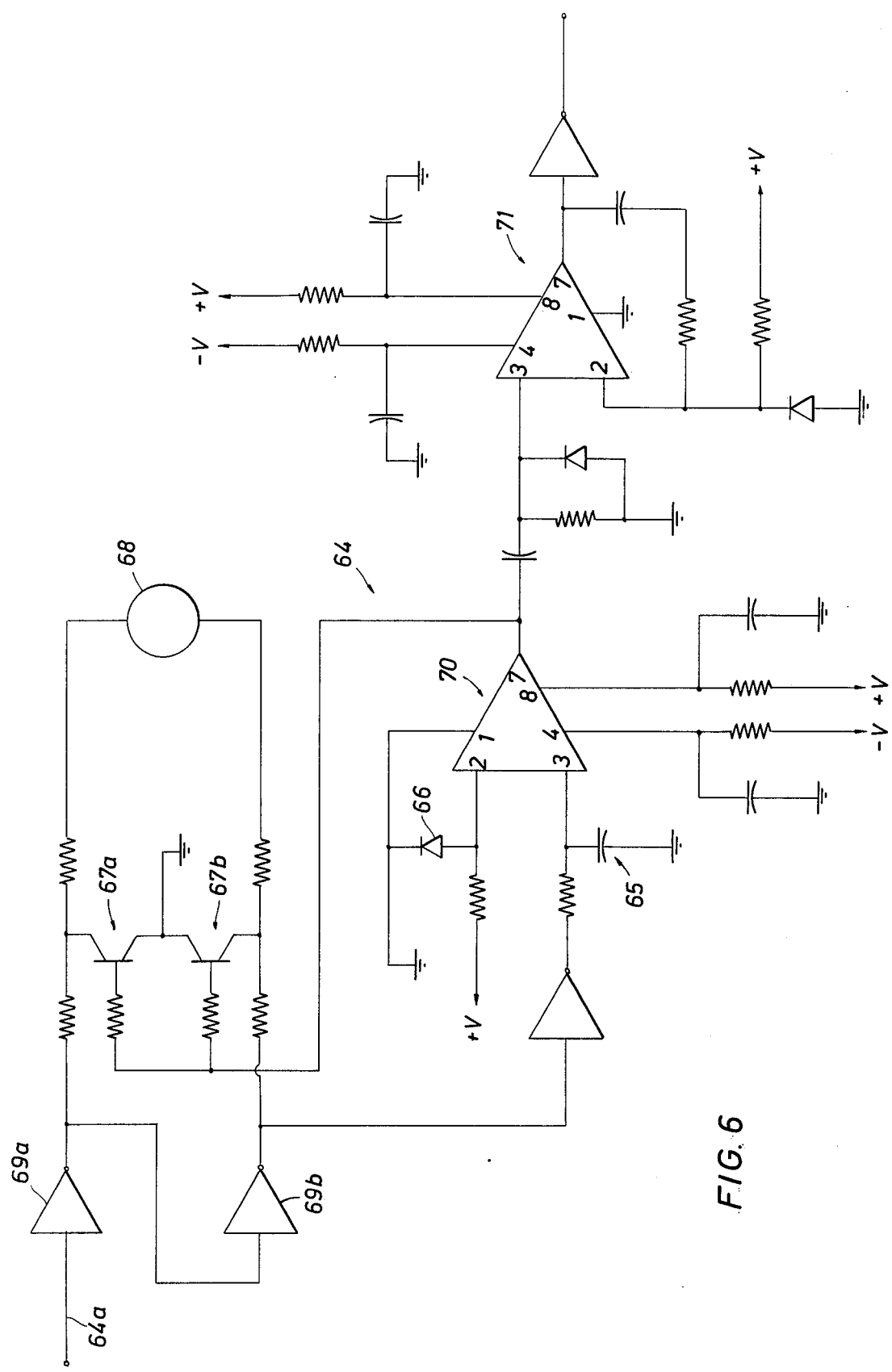
Figures 7, 8:
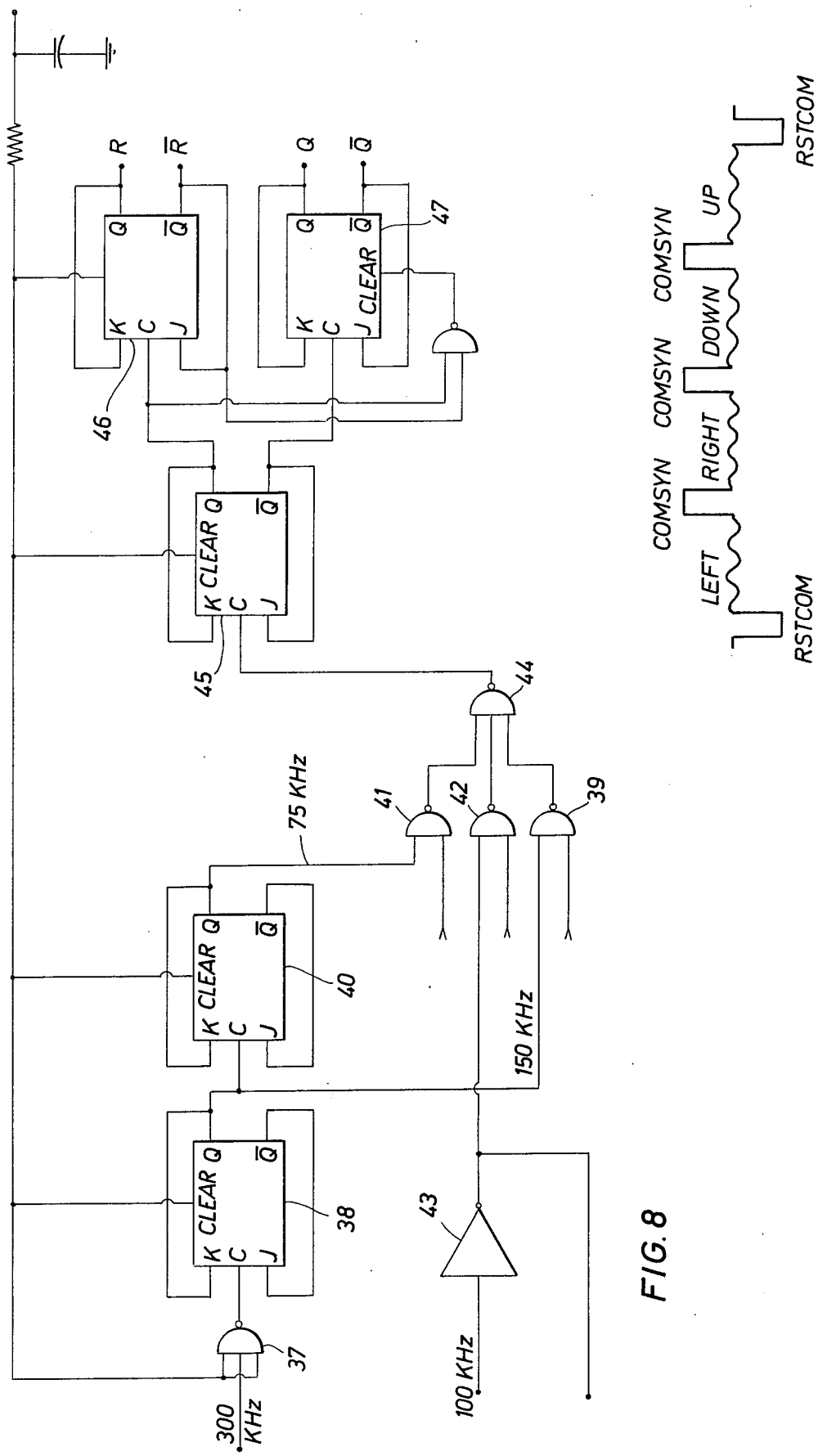
Figure 13:
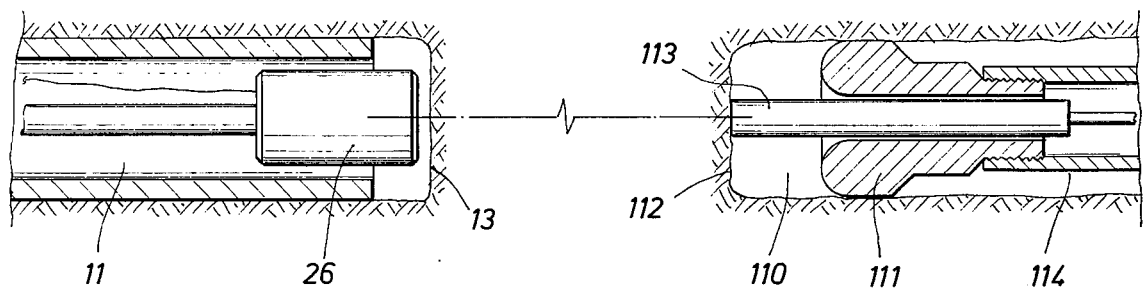
Figure 14:
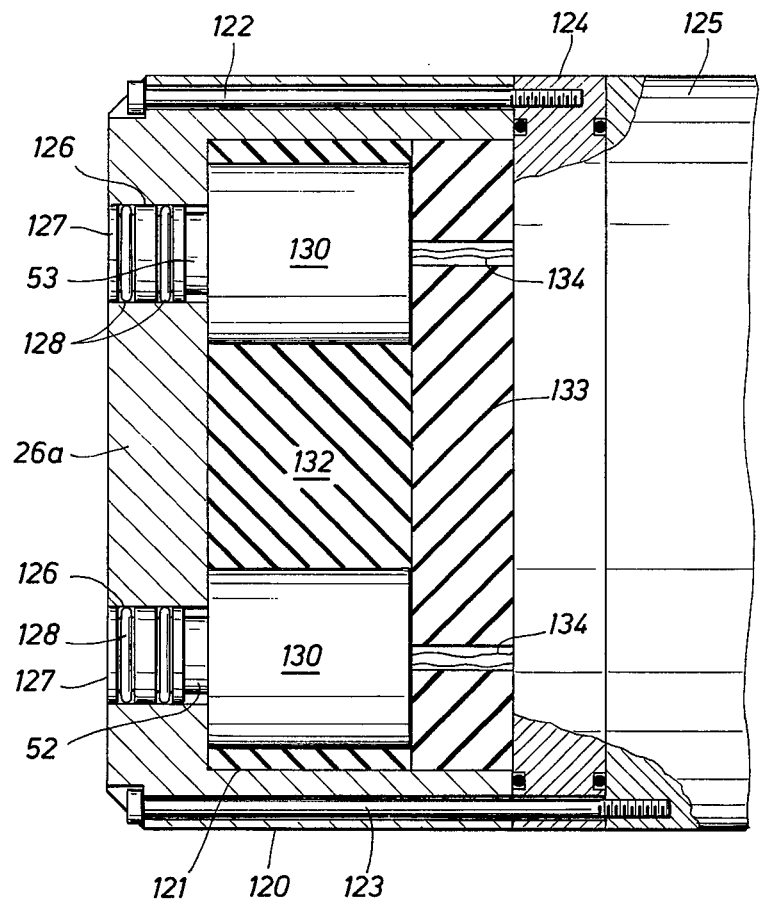

FIGS. 5A, 5B, and 5C show various wave forms of signals produced by the circuit of FIG. 5;

FIG. 6 is a circuit diagram of the portion of the receiver that receives the microphone orientation signal from the torpedo and indicates the orientation of the microphones of the torpedo;

FIG. 7 illustrates the resultant composite signal from the four microphones that is transmitted to the receiver after being multiplexed and amplified;

FIG. 8 is a diagram of a portion of the circuitry used to count down a crystal generated signal to three desired reference frequencies;

FIGS. 9A, 9B, 9C, and 9D are typical wave forms of the signals produced by the sin/cos chopper of the receiver;

FIG. 10 is a representation of the voltage build-up in the phase storage circuits as the signals of FIGS. 9A–9D are integrated during each sample time;

FIG. 11 is typical of the wave form produced by the remodulator chopper of the receiver;

FIGS. 12A and 12B are typical resultant wave forms of the signals that result from the combining of the left/right or up/down signals from the phase demodulator;

FIG. 13 is a cross section of the bottom portion of the two well bores to be connected showing an alternate arrangement for transmitting the signal from the well being drilled to the previously drilled well bore; and FIG. 14 is a cross section through the microphone array of the torpedo.

In the above-identified patent of Hooper, a pipeline is constructed around an obstruction by drilling a well from one side of the obstruction to intersect a well previously drilled from the opposite side. Pipe is then placed in the well bores to extend from one side to the other. Preferably, the longitudinal axes of the two well bores coincide at the point of intersection. This invention will be explained in detail as it is used to accomplish this.

Figure 1:
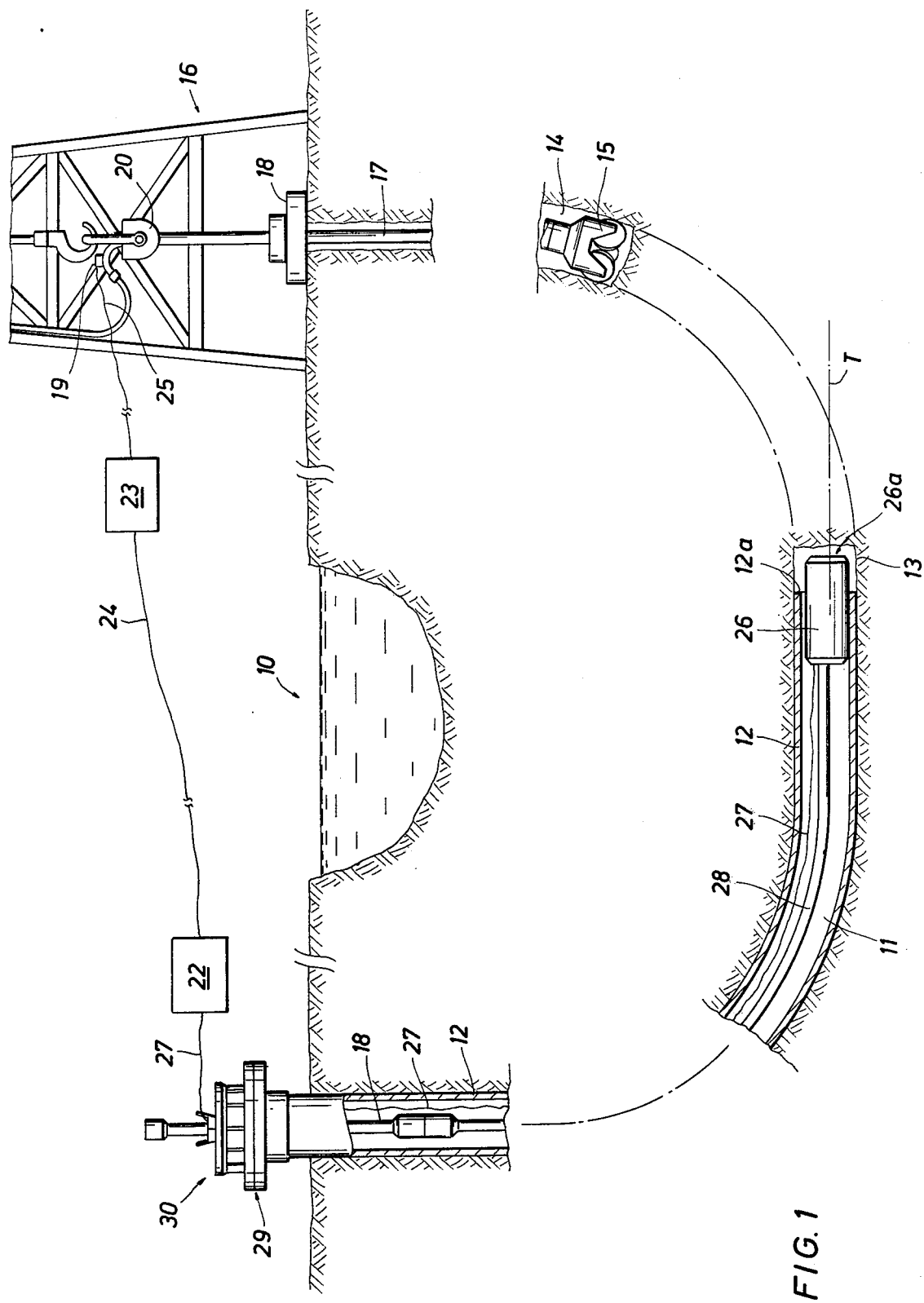
FIG. 1 is a schematic diagram showing a second well bore being drilled to intersect a first previously drilled well bore with the apparatus of this invention in position to indicate the position of the drill bit relative to the target area of the first well bore.

As shown in FIG. 1, first well bore 11 has been drilled to a point below river 10, which is the obstruction in the path of the pipeline. After it is drilled, casing can be set in the hole if desired, or if the well bore is in good shape and will stand up for a reasonable length of time, the actual casing of the well bores can wait until after the second well bore has been completed. As shown, casing string 12 has been placed in well bore 11 with its lower end 12a adjacent bottom 13 of the well bore. Only one string is shown. Additional casing strings may be desirable or necessary in some areas. Also as shown, the longitudinal axis of the well bore adjacent the end thereof is substantially horizontal and preferably well bore 14, the second well bore to be drilled on the other side of river 10, will intersect well bore 11 along the same horizontal axis.

Well bore 14 has not been completed, but the dotted lines indicate the desired course of travel of drill bit 15 as it drills the second well bore until it intersects the bottom of the first. As shown, the second well bore is to follow a curved path until interception occurs. Preferably, the axis of the second well bore will coincide with the axis of the first while the two bores are still spaced apart so that the final portion of the second bore can be drilled along a straight line toward the first for some distance before intersection occurs. As will be explained in more detail below, the apparatus and method of this invention employs a compression wave signal that is transmitted through the ground between the two well bores. The distance such a signal can travel through the ground without attenuating is a function of the frequency of the signal and the medium through which it travels. Specifically, the frequency must be selected for the medium. For example, a compression wave signal with an ultrasonic frequency can travel a substantial distance through a solid medium, such as sandstone or limestone formation. Conversely, such high frequency compression waves are attenuated rapidly in loose, unconsolidated formations. For these, the lower the frequency the less the attenuation over a given distance. Also, affecting the rate of attenuation in all mediums is the water content.

Modern directional drilling technology usually, can guide the drilling of the second well bore to somewhere within a point in a sphere of about 25 feet in diameter at depths of three to four thousand feet. The distance the sphere is from the first well bore determines the distance the signal must travel and reach the first well bore with a signal strength such that it can be distinguished from the ambient noise.

For example, assume that the second well bore is drilled to within about 700 feet of the first well. Assume also that a signal of about 50 dB is desired at the first well bore. If the transmitted signal is 150 dB, then it can lose 100 dB as it travels through the medium. In formations that are not solid and elastic, the signal loss in dB per unit distance increases directly with the viscosity of the medium and as the square of the frequency. Thus, the lower the frequency, the lower the losses.

Another consideration, however, is the velocity of the signal, as this affects the wave length which determines, along with other factors, the mechanical angle from the desired course that the apparatus can measure. The velocity of sound varies greatly between different formations and in the same formation due to varying water content. Various studies have been made of the velocity and attenuation of sound in various media. The particular frequency range used in the practice of this invention will depend on the earth formations between the two bore holes. For one crossing, the two bores are designed to intersect in a coarse, sandy clay containing some water, but not expected to be saturated. Three signals were chosen having frequencies of 1350, 1875, and 2700 Hz. Three frequencies were selected for reasons that will appear below. They were selected as follows:

Tests run on various formations indicated that attenuation ranged from 0.5 dB/meter for medium clay at 28.4 kHz to 20 dB/meter for fine sands at 30–37 kHz. Other tests indicated that attenuation increased as frequency increased. The increase was exponential and was related to frequency by the factor $f$ to the 1.75 power. Assuming the worst attenuation characteristic of 20 dB/meter, the upper frequency limit for propogating 700 feet with a maximum loss of 50 dB is 3000 Hz. With an 150 dB signal and assuming a 50 dB loss due to other factors, such as spherical dispersion, the acquired signal at the first well bore will be 50 dB, which is what is desired. Lower frequencies should have fewer losses so the three above were selected. The wave length of the signal and the spacing of the detectors must be considered also to make sure that the desired mechanical angle to be indicated provides an electrical angle large enough to be measured accurately.

Conventional drilling rig 16 is shown schematically in position drilling second well bore 14, using drill pipe 17 and rotary table 18. In accordance with this embodiment of the invention, an elastic wave type signal of preselected frequency is transmitted from drill bit 15 into the ground. In the embodiment shown in FIG. 1, the signal is transmitted to bit 15 and then into the ground by exciter transducer 19 mounted on swivel 20 which supports the drill pipe as the drill pipe rotates bit 15 against the bottom of well bore 14. The reference signal is generated in receiver 22 and amplified in amplifier 23 located adjacent drilling rig 16. The reference signal is transmitted from receiver 22 to amplifier 23 by cable 24. The signal is then transmitted to the exciter transducer by cable 24a after amplification. The signal then travels down the drill pipe and into the ground at the bottom of the hole through the bit.

Located in the target area in first well bore 12, which in this case happens to be the bottom of the well bore, is torpedo 26. The torpedo includes the microphones that pick up the reference signal transmitted into the ground by bit 15. The torpedo is connected to receiver 22 on the surface adjacent the first well bore by electrical cable 27. The torpedo is positioned in the well bore by drill string 28 which is supported on well head 29 by slips and slip bowl assembly 30. The microphones are positioned in the torpedo so that a good acoustic connection can be established between the microphones and the formation at the bottom of the well bore. In the embodiment shown, the microphones are located in end plate 26a of torpedo housing 26 in a manner to be described in detail below in connection with FIG. 14. A clay-water mixture of sufficient viscosity to have elastic characteristics when subjected to sound should be placed at the bottom of the well bore in an amount sufficient to cover the torpedo and insure a good acoustic coupling between the microphones and the ground.

In operation then, receiver 22 generates a reference signal of the preselected frequency. This signal is transmitted to drill stem exciter 23 by cable 24. The drill stem exciter includes a power amplifier that drives a step-up transformer. The output of this transformer is transmitted to exciter transducer 19 on the swivel through cable 25. The exciter transducer vibrates at the preselected reference frequency, and in doing so induces a longitudinal compression wave of the same frequency in the drill pipe and drill bit 15. This signal then is transmitted into the ground by the drill bit which is in engagement with the bottom of well bore 14. The signal can be transmitted continuously, but probably, to avoid the "noise" produced by a rotating bit, the better practice will be to stop drilling operations when the signal is to be transmitted to check the position of the well bore relative to its desired course.

In one embodiment of the invention, the exciter transducer is a monolitic piezoelectric "crystal" of lead zirconatetitanate that is clamped between two metal plates, which in turn are clamped rigidly to swivel 20. When the piezoelectric crystal is subjected to the reference signal, it will expand and contract at the reference frequency. With a ¾ inch thick lead zirconatetitanate crystal, the driving signals are chosen so that a voltage of from 300 to 500 volts peak to peak appears across the crystal.

Figure 2:
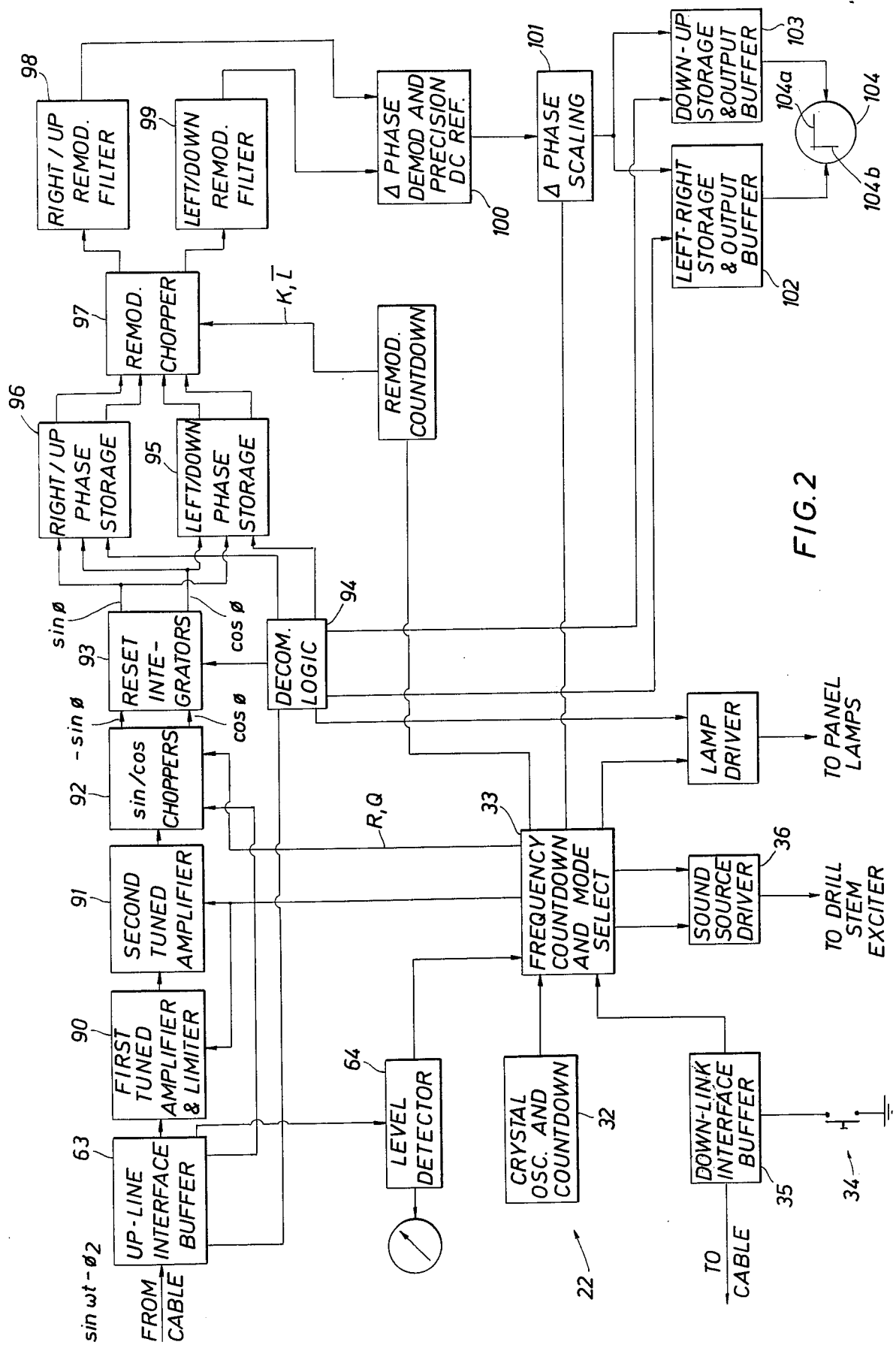
FIG. 2 is a block diagram of the electrical circuitry in the portion of the apparatus called the "receiver" that is located at the surface and gives a visual indication of the position of the bottom of the well bore being drilled relative to the receiver.

As stated above, the reference signal is generated in receiver 22. A block diagram of the electrical components that make up this receiver is shown in FIG. 2. The reference signal is obtained by crystal oscillator and countdown circuit 32. Preferably, the apparatus is arranged to provide three reference signals. For purposes of this description, three signals having frequencies of 18.75 kHz, 25 kHz, and 37.5 kHz, will be used, which would be the range of frequencies selected for formations that are excellent conductors of sound, such as water bearing sandstone or limestone. In such formations, the signal velocities will reach 10,000 fps with little attenuation. To obtain these frequencies, the crystal oscillator provides a signal of 1.2 mHz. The output of the crystal may then be counted down to two signals, one of 100 kHz and the other of 300 kHz, by dividing the output of the crystal by 12 and 4, respectively, using a series of J-K flip-flops. These latter signals are then transmitted to additional frequency countdown circuits in frequency countdown and mode select circuits 33, where the three reference signals 18.75 kHz, 25 kHz, and 37.5 kHz are obtained. The particular frequency used is selected by the operator by pressing the mode select button 34 which is mounted on the front of the panel that houses the receiver electronics. The mode select switch steps between the high, medium, and low frequency mode of operation and the level mode, which, as will be explained below, indicates the orientation of the microphones of the receiver. When the desired reference frequency is selected, the proper mode select logic signal is transmitted to link interface buffer 35, then to frequency countdown and mode select circuitry 33 which will cause the selected reference signal to be connected to sound source driver 36, from which the selected reference frequency is transmitted to drill stem exciter 23 and exciter transducer 19 on the swivel. Three reference frequencies are provided so that the indicated positions obtained with each can be checked against the others. In other words, by switching between the three reference frequencies, three indicated positions will be obtained, and in most cases at least two of these will be very close to each other. These two will be accepted as correct, whereas the frequency that produces a result that differs substantially from that of the other two will be considered to be in error and thus ignored.

The countdown portion of frequency countdown and mode select logic circuit 33 is shown in FIG. 8. As shown in the circuit, the 300 kHz signal from crystal oscillator and countdown circuit 32 is connected through nand gate 37 to a first J-K flip-flop 38, which counts down the 300 kHz signal to a 150 kHz signal. This signal is connected to nand gate 39 and also to a second J-K flip-flop 40, which counts down the signal to 75 kHz, which is then connected to nand gate 41. The 100 kHz signal is connected to nand gate 42 through amplifier 43. Nand gate 44 then can select any one of the three signals, i.e., 75, 100, and 150 kHz, from one of nand gates 41, 42, and 39. Which signal is selected will depend upon the logic mode in which the apparatus is placed by the logic mode select switch on the front of the panel. Whichever signal is selected will be first counted down fifty percent by J-K flip-flop 45, and the output of this flip-flop will again be divided in half by J-K flip-flops 46 and 47. The frequency of the signals from flip-flops 46 and 47 will be either 18.75, 25, or 37.5 kHz, depending upon whether the 75, 100, or 150 kHz signal is selected by nand gate 44. The outputs of the J-K flip-flops 46 and 47 have been designated R, R̄, Q, and Q̄. The R output is arbitrarily stated to be sin $\omega t$. The R̄ signal, since it is 180° out of phase with R, is $-\sin \omega t$. The output of J-K flip-flop 47 is 90° out of phase with the output of flip-flop 46, therefore Q is the cos $\omega t$ and Q̄ is $-\cos \omega t$. These four signals, all of the selected frequency, will be used later to obtain the desired signal that is proportional to the phase difference (hereinafter called the relationship) of the signals picked up by pairs of microphones, in the preferred embodiment of the microphone array, in the torpedo located in the target area of the first drilled well bore. The signal R is the signal that is transmitted to the exciter transducer, and is the reference signal that is transmitted into the ground.

Figure 4:
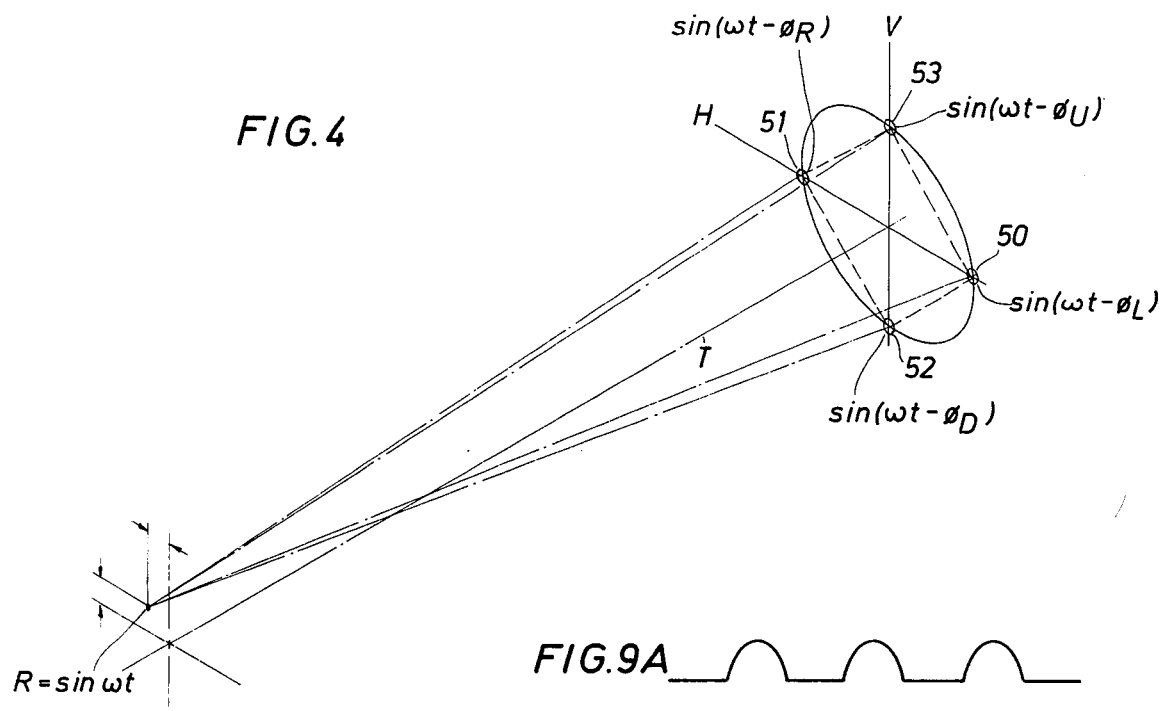
FIG. 4 is a schematic diagram of the preferred orientation of the microphones of the underground torpedo portion of the apparatus relative to the desired course of the well bore being drilled.

As explained above, the torpedo includes an array of microphones that pick up the signal transmitted into the ground from the drill bit. Any desired number of microphones can be used. In the embodiment shown, the torpedo has four microphones, 50, 51, 52, and 53 (FIG. 4). These microphones are mounted in the torpedo so that each microphone is at the corner of an imaginary square, (shown dotted in the perspective view of the microphones in FIG. 4), the center of which is intersected by the desired line of travel, T, of the drill bit as it intersects the first well bore. The microphones are in a plane that is perpendicular to this desired line of travel.

The orientation of the microphones with respect to the vertical and horizontal axes in the plane in which they are located must be known; therefore, means are provided to indicate at the surface the orientation of the microphones. Since the inclination of the portion of the well bore in which the torpedo is located is known before the torpedo is placed in the hole, the orientation of the microphones relative to the longitudinal axis of the torpedo is all that is required. In the application shown in FIG. 1, the longitudinal axis of the hole where the torpedo is located is horizontal so the microphones are mounted to lie in a plane that is perpendicular to the longitudinal axis of the torpedo, which axis coincides with the desired direction and path of travel T of the drill bit when it intersects the first well bore. As explained above, preferably the drill bit will follow a path that coincides with the longitudinal axis of the previously drilled well bore as it approaches intercept. This will provide a well bore that extends from one side of the obstruction to the other without any sharp bends. To simplify the indication of the location of the drill bit relative to its desired path, the microphones are referred to as left, right, down, and up, i.e., microphone pair 50 and 51 are level with line T and on opposite sides thereof, and microphone pair 52 and 53 are directly above and below the line.

Figure 3:
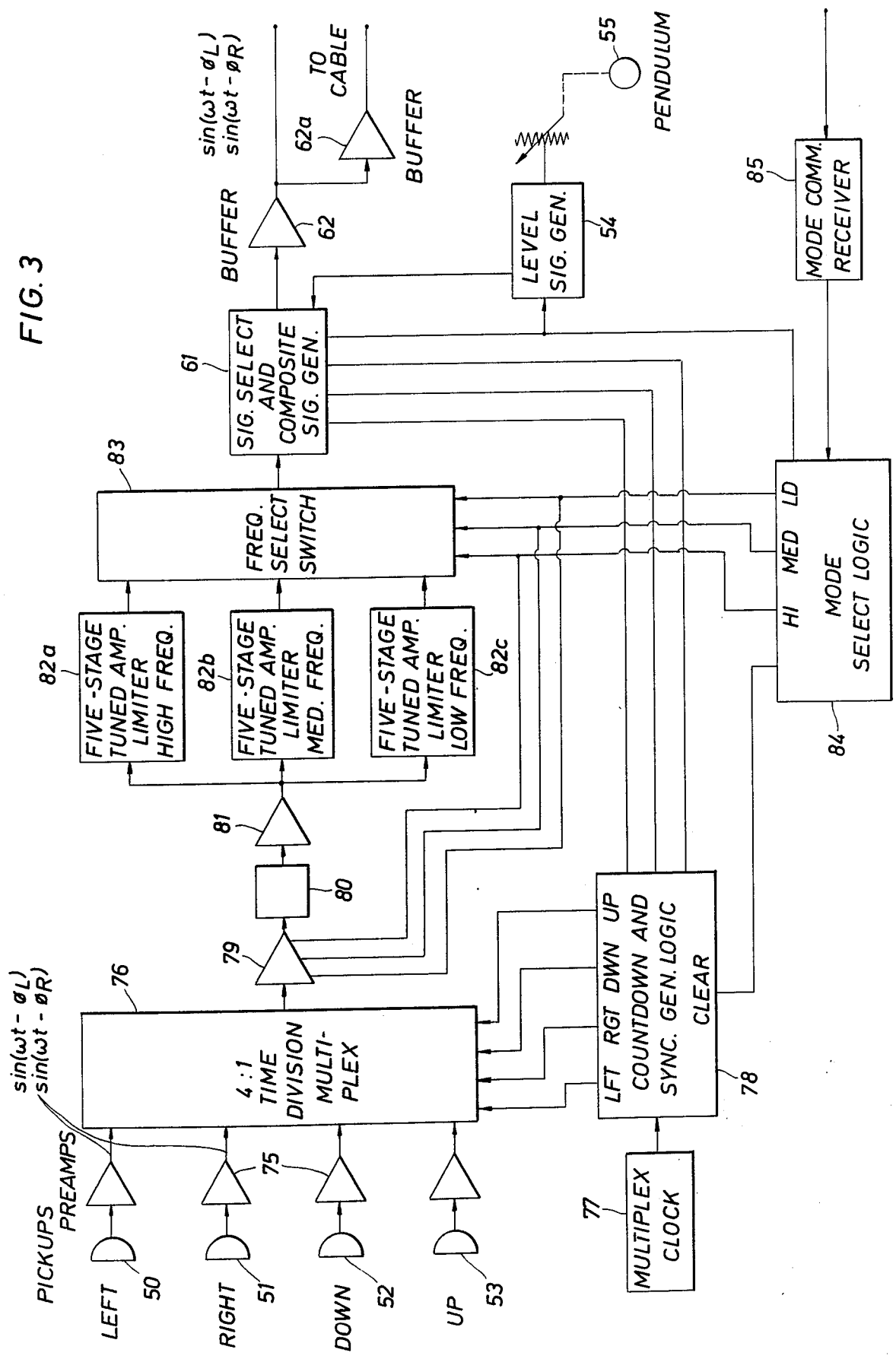
FIG. 3 is a block diagram of the electrical circuitry in the portion of the apparatus called the "torpedo" that is located in the first drilled well bore.

In the embodiment shown, the means for indicating the position of the microphones in the vertical plane includes level signal generator 54 and pendulum 55 (FIG. 3). The electrical circuit in level signal generator 54 is shown in FIG. 5. It includes free running multivibrator 56 that has potentiometer 57 in the base bias network. Wiper 57a of the potentiometer is mechanically connected to pendulum 55 so that movement of the pendulum will move wiper 57a. All of the resistances and capacitors in the base bias circuit are equal, therefore when wiper 57a is in the center of potentiometer 57, a uniform fifty percent (50%) duty cycle output, such as shown in FIG. 5A, will be obtained. This is arranged to be the condition when the microphones are positioned as shown in FIG. 4. If this is not the case, the pendulum will move wiper 57a to one side or the other, causing an imbalance in the resistance in the base biased network of the multivibrator, producing in one case an output wave form such as shown in FIG. 5B, and in the other output wave form shown in FIG. 5C. The output of the multivibrator is fed to a voltage comparator 58. When the apparatus is not in the level mode, i.e., the position of the microphones is not being checked, transistor 59 is nonconducting and the inverting input of the comparator is biased to a positive voltage. This holds the output to its low state (approximately minus 0.5 volts in one embodiment of the invention). The comparator is designed such that whichever input is more than 5 millivolts positive with respect to the other will determine the output state. Diode 58a is arranged to limit the input from the multivibrator such that the output of the multivibrator can have no effect on the output of the comparator while transistor 59 is open and non-conducting. When a level signal is sent to the torpedo from the receiver, transistor 59 conducts and shorts the inverting input to ground. Now the output of the comparator will go positive when the output of the multivibrator goes positive. This circuit serves to squareup the multivibrator wave form during the level mode of operation, as well as preventing transmission of the level signal during other modes of operation.

The output of comparator 58 is fed to the normally open input of SPDT semiconductor switch 60 in the signal select and composite signal generator circuit 61. The level command from the receiver, in addition to causing transistor 59 to conduct, also switches SPDT switch 60 so that only the level signal is fed to the cable through buffer 62. Thus, when switch 60 connects the output of the comparator to the cable, it also disconnects other data and sync signals coming from the microphones and other apparatus from the cable, so that the sync signals and other signals cannot interfere with the level signals.

The level signal from the cable is fed to up-link interface buffer circuit 63. This circuit is located in the receiver. With the receiver in the level mode, the signal received from the cable is fed from the up-link interface buffer to level detector circuit 64. The circuit of level detector 64 is shown in FIG. 6. When the level signal is received through line 64a by the level detector circuit, capacitor 65 is charged until its dc level exceeds the bias set by diode 66. When this point is reached, transistors 67a and 67b become nonconducting and the incoming signal on line 64a is brought to ammeter 68. The ammeter is located on the front panel of the receiver. The signal is fed to opposite sides of the ammeter through logic inverters 69a and 69b so that if the signal is of uniform sixty percent (60%) duty cycle, such as the signal of FIG. 5A, the ammeter will read zero indicating the proper orientation of the torpedo and the microphones mounted thereon. If the signals received do not have the same duty cycle, as is the case with the signals shown in FIGS. 5B and 5C, the ammeter will not read zero thereby indicating the amount and direction that the microphones are not properly oriented in the well bore. To correct this, drill pipe 28 is rotated in the proper direction to bring the meter reading to zero, thereby properly orienting the microphones.

When the equipment is in other modes of operation than the level mode, the level signal is gated off by holding the output of comparator 70 in its highest state. This causes transistors 67a and 67b to conduct thereby shorting the meter to ground. This prevents meter response to signals during the other modes of operation of the apparatus. Another function of level detector circuit 64 is to reset the receiver mode register. When the level signal causes the output of comparator 70 to go low, turning off transistors 67a and 67b, it also triggers one shot multivibrator 71 which provides a reset pulse to the receiver mode register, setting it to the level mode.

The torpedo is now properly oriented in the target area of the first drilled well bore. As stated above, the microphones can be positioned in any desired orientation, however, for simplicity in interpreting the signals received by the microphones, they are preferably positioned with the microphones at the corners of an imaginary square, with one pair of microphones on a vertical line V that intersects the desired line of travel of the drill bit, and the other pair on a horizontal line H that intersects this same reference line (FIG. 4). As shown in FIG. 3, microphones 50 and 51 have been designated left and right, whereas microphones 52 and 53 are down and up. In other words, looking toward the drill bit along the desired line of travel of the bit, microphone 50 will be on the left hand side of the line, microphone 51 will be on the right hand side, microphone 52 will be directly below the line, and microphone 53 will be above it, all equally spaced from each other, of course, and from the desired line of travel. The signals transmitted into the ground through the drill bit will travel through the ground to the microphones. The reference signal is $R = \sin \omega t$. The transmission of the signal from the bit to the microphones is considered to emanate from a point source P (FIG. 4). When the signal reaches each microphone, it will be $\sin (\omega t - \phi)$, where $\phi$ is the phase angle between the signal received by the microphone and reference signal R. For our purposes here, we will designate $\phi_L$ as the phase angle of the signal received by the left microphone 50, $\phi_R$, $\phi_D$, and $\phi_U$, for the right, down, and up microphones, respectively.

As shown in FIG. 3, the signals from the microphones pass through wide bandwidth preamplifiers 75 to time division multiplex switching circuit 76. Multiplex clock 77 provides countdown and synchronizing signal generating logic circuit 78 with a timing signal. Countdown and sync generating logic circuit 78 provides signals in sequence to operate the switches in the time division multiplex circuit to multiplex the four signals received from the microphones so that they all will travel through the same electrical circuits on their way through the torpedo and the receiver at the surface. This is done so that any distortion, especially phase shift, of the signal due to inherent characteristics of the circuits themselves will affect all signals in the same way, and therefore cancel out when the signals reach their end use point. The incoming signals are multiplexed so that the left/right signals are adjacent and so are the up/down signals. Arbitrarily, the sequence of the signals in the apparatus shown is left, right, down, and up, with the time period of each signal being approximately one second in duration.

The multiplexed signal from the microphones are then amplified in amplifier 79, which is connected to limiter 80 to limit the amplitude of the signals leaving the amplifier. These signals then pass through buffer 81 into one of three five stage tuned amplifier-limiter circuits, depending upon the reference frequency being used. Five stage amplifier-limiter circuit 82a is designed for use with the high frequency reference signal 37.5 kHz, 82b with the medium frequency, 25 kHz, and 82c with the lower reference frequency 18.75 kHz. The five stage amplifier circuit that is used is determined by frequency select mode switch 83 which controls the torpedo mode select logic circuit 84 by a signal, from the receiver at the surface, which commands the apparatus to the high, medium, or low frequency modes (or the level mode, as explained above).

Thus, in accordance with this invention, the signals, after being preamplified in amplifiers 75, pass through several stages of amplification before being sent to the surface. For example, in one embodiment of the invention, preamplifier 75 had a gain of 10. Amplifier 79 was a low Q tuned stage amplifier, with a gain of approximately 5. Buffer 81 was a broad band buffer, with a gain of 2. Then in the five stage amplification circuits 82a-82c, each amplifier in each of the five stages was a high Q, tuned, amplifier having a gain of 6. Thus, a total distributed gain was obtained of approximately $3.5 \times 10^5$. A gain in this order is required to allow acquisition and processing of signals in the microvolt range. The high Q tuning serves to reject unwanted signals, such as drill noise, etc., that would be transmitted to the ground along with the reference signal as the drill bit is rotated and held against the bottom of the well bore. High gain amplifiers, however, have limited dynamic range. If the amplifier is capable of raising microvolt signals to usable levels, a problem occurs when stronger signals are received. Usually, in this case, the amplifiers in the last or next to last stage of amplification will saturate, causing the signal to be severely distorted. Because this apparatus relies on the preservation of phase differences, no distortion that could cause phase shifts could be tolerated. For this reason, several limiters are placed in the amplifier string. These limiters are so called "soft limiters" because their limiting effect comes in gradually as signal level increases. Low level signals are not affected, therefore when very low level signals are received, the limiters have no effect and full amplification is utilized. As the signal, of course, gets closer and the signal level rises, limiting action occurs. The amplifier stage gains are so chosen that if a preceding limiter is at full limit, the succeeding stage cannot saturate. This allows the amplifier to utilize microvolt level signals and yet not saturate when fed signals up to 0.25 volts.

The output from the tuned amplifiers is fed to the output buffer circuitry through signal select and composite signal generating circuit 61. There the amplified multiplex signal from the microphones is gated with synchronizing signals provided by the synchronizing generating logic circuits of circuit 78. The composite signal produced is shown in FIG. 7. As can be seen in the drawing, the composite signal includes commutator sync signals (COMSYN) following three of the microphone signals and the commutator resetting sync signal (RSTCOM) at the end of the fourth microphone signal to reset the circuits at the end of each sequence, to receive a new sequence of left, right, down, and up signals. This composite signal is fed to buffers 62 and 62a, which are balanced output amplifiers that provide a push-pull drive to a balanced cable pair.

The only other circuitry in the torpedo not previously identified is the command receiver 85. This circuit receives the initial mode select command signals from the receiver and transmits them to the mode select logic circuit.

Means are provided on the surface for measuring the phase relationship of the four signals from the microphones and providing signals proportional to the phase difference between pairs of signals. This circuitry is found in receiver 22, along with indicating means responsive to the signals that are proportional to the differences in phase angles of the signals to indicate the position of the device from which the signal enters the ground, such as drill bit 15, to indicate the position of the device relative to a reference line. Referring now to FIG. 2, the composite signal is received from the torpedo in up-link interface buffer 63. The signal is then amplified again in first and second tuned amplifiers 90 and 91, and fed to sin/cos choppers 92. The signals entering the choppers are $\sin (\omega t - \phi)$ with each signal from each microphone varying from the reference signal R only in phase angle $\phi$. The incoming signals are half-wave chopped against the reference signal R, which is the $\sin \omega t$ and reference signal Q which is $-\cos \omega t$. For each microphone signal, the choppers produce two outputs, one is $\sin^2 \omega t \cos \phi$, and the other is $-\cos^2 \omega t \sin \phi$, where $\phi$ is the lagging phase angle of the incoming signal with respect to the R reference. The wave form for these two signals typically is shown in FIGS. 9A and 9B, respectively. (If desired, for improved signal to noise ratio, the signals from the microphones could also have been full-wave chopped against reference signals R and $\overline{Q}$ and the output of the chopper would appear as shown in FIGS. 9C and 9D.) The two signals from the choppers are then fed to the reset integrators 93, which will integrate the outputs of the sin/cos choppers for one sample time. The sample time is controlled by logic circuit 94 and is arbitrarily chosen to allow the integrators to operate long enough to get a representative final value for the signal. For example, it could be set to integrate the area under wave forms 9a and 9b for one second, for each of the left, right, etc., signals from the torpedo. The period between successive COMSYN or COMSYN and RSTCOM signals of the composite signal controls the integrating time for each microphone's signal. The outputs of the integrators are two signals each having a wave form as shown in FIG. 10. This signal varies in amplitude and slope as $\phi$ varies. The integrators integrate the signals from the choppers 92 and produce two signals that have a dc peak voltage value proportional to sin $\phi$ and —cos $\phi$. These dc voltages are stored in the proper phase storage circuit. For example, if the integrators first integrate the signal from the left microphone, the two signals from the integrators will build up in left/down phase storage circuit 95 until one of the sync pulses actuates logic circuit 94 to reset the integrators to zero. The integrators will then integrate the area under the signals resulting from the signal from the right microphone and store them in the right/up storage circuit. The four stored dc voltages that correspond to the integrated left and right signals (—cos $\phi_L$, sin $\phi_L$, —cos $\phi_R$) are fed together to the remodulator choppers 97 where they are chopped against remodulator reference (3.75 kHz) signals K and $\overline{L}$. As before, K is sin $\omega t$, while $\overline{L}$ is cos $\omega t$. In one chopper, —cos $\phi_L$ is chopped against K and sin $\phi_L$ is chopped against $\overline{L}$. Then the two chopped signals are added. Similarly, in the other chopper the signal —cos $\phi_R$ is chopped against K and sin $\phi_R$ is chopped against $\overline{L}$ and the two are subtracted. The two output signals then are ($\overline{L}$ sin $\phi_L$ —cos $\phi_L$K) and (K sin $\phi_R$ —cos $\phi_R\overline{L}$) with a wave form similar to the typical waveform shown in FIG. 11.

The outputs of the remodulator choppers are filtered by bandpass filters 98 and 99 to select only the frequency components at the remodulator reference frequency, which are sin ($\omega t + \phi_L$) at the left/down remodulator filter output and —cos ($\omega t + \phi_R$) at the right/up filter output. The filtered outputs for the left signal from filter 98 and for the right signal from filter 99 are squared up by voltage comparators and brought to the phase demodulator circuit 100. The output of the demodulator is a doublet pulse whose duty cycle (and, consequently, average dc value) is proportional to the phase difference between the square waves. If the two signals, up and down (or left and right) are of the same phase, which would be the case if the drill bit is moving along the desired line of travel, the duty cycle of the doublet will be fifty percent. If the bit is off the desired line of travel to the right or left, the two signals will not be in phase. FIG. 12A shows the left/right or down/up doublet when the two signals are in phase. FIG. 12B shows the waveform of the doublet when the signals of a given pair are not in phase. The average dc value of the doublet is derived by a long time constant low-pass active filter in circuit 100. The dc values for the left-minus-right and the down-minus-up doublets are then scaled in circuit 101 so that their values are proportional to the mechanical angles off the reference line in the direction of the horizontal axis and vertical axis, respectively. The resultant outputs drive the angle indicating meter 104, the left-minus-right and down-minus-up signals being supplied to the meter through storage and output buffers 102 and 103, respectively. The circuits of storage and output buffers 102 and 103 are such that the value of the left/right signal will be retained in the meter during the time period when the down/up signal is being placed in the other meter (and vice versa). The retained signals are passed through the output buffers, which are long time constant smoothing filters so that smooth and continuous readings of drill bit position are obtained. The meter has two scale members 104a and 104b. 104a is controlled by the down/up signal and indicates the angle that the bit is above or below the reference line along the vertical axis. The other scale member, 104b, shows the angle the bit is to the right or left of the desired reference line along the horizontal axis. Where the two scale members cross is the angular position of the bit relative to the reference line.

In the embodiment described above, the signal to be detected was transmitted down the drill pipe and into the ground through the drill bit. This system may not be satisfactory. The drill pipe may be laying against the side of the well bore for a substantial distance and this may dampen the vibration of the pipe such that the signal is lost. Therefore, it may be the preferred practice of the invention to locate the signal generator so that the signal is transmitted directly into the ground at the bottom of the well bore.

In FIG. 13, torpedo 26 is positioned adjacent bottom 13 of first well bore 11 in the same manner as described above with respect to FIG. 1. Second well bore 110 is being drilled by bit 111 to intercept the first bore. Bit 111 has been moved out of engagement with bottom 112 and vibrator or signal generator 113 is located in engagement therewith. It is supported on electric cable 114 that also supplies operating power to the vibrator.

Bit 111 is of the core type having a central opening through which the vibrator can extend to engage the bottom. When drilling, this opening can be closed with a retrievable core breaker in the conventional manner. Then, after drilling a given distance, the core breaker is removed by a wire line. The vibrator is then lowered through drill pipe 114 into the position shown. The desired signals can then be transmitted directly into the ground and the deviation of the well bore from the desired course will be indicated at the surface. The vibrator can then be retracted and drilling resumed to correct the direction of the bore, if necessary. This procedure is repeated periodically until the two well bores intersect.

With a plurality of microphones located in the same instrument relatively close together, there is always a possibility of cross-talk between the microphones. It is a feature of this invention to provide a microphone assembly that will greatly reduce such cross-talk.

FIG. 14 is a cross section through the microphone assembly that comprises the forward portion of torpedo 26. All four microphones are supported in the same manner, only two, 52 and 53, are shown. Cup-shaped housing 120 provides front plate 26a, previously mentioned, and cavity 121. Side wall 120 has a plurality of openings through which mounting bolts 122 and 123 extend. Bolts 122 attach housing 120 to plate 124. Bolts 123 extend through the spacer plate and connect housing 120 and plate 124 to housing 125 of the torpedo. This arrangement allows the microphone assembly to be removed and held in one piece when the inside of the torpedo is being serviced.

A plurality of openings 126 extend through front plate 26a and connect cavity 121 to the outside. Located in each opening is a piston 127. The pistons carry seals 128 that are in sealing engagement with the walls of the openings. The pistons will be urged to move due to any pressure differential across them. Microphones 52 and 53 are held in engagement with the pistons by inertia members 130. These members serve to resist movement of the microphones due to their mass to insure that good acoustic contact is maintained between the microphones and the pistons. Preferably, they are made of high density material, such as steel. The inertia members are held in place in cavity 121 by body 132 of sound absorbing material, such as an elastomer. Disc 133 of a similar material is used to fill the cavity between the members and plate 124. This disc is removable to allow access to members 130, which in this embodiment, also serve as housings for pre-amplifiers 75. Leads 134 connect the pre-amps with the circuitry in the torpedo.

As the torpedo is lowered into the well bore, the ambient hydrostatic pressure increases. This pressure acts against pistons 127 urging them against the microphones. This force is transmitted to inertia members 130 and body 132 of filler. The sound signal is transmitted to each microphone through its associated piston. The mass of members 130 and the sound absorbing ability of body 132 greatly reduce the possibility of any portion of the signal received by one microphone from being transmitted to another.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for sensing the position of a drill bit in a second well bore relative to a given reference line from a target area in a first, previously drilled, well bore comprising means for vibrating the drill bit at a preselected frequency with the bit in engagement with the bottom of the second well bore to cause the drill bit to impart an acoustic signal of said frequency into the earth, four microphones positioned in the target area of the first well bore in a plane transverse the reference line and equally spaced from each other and from the reference line to provide four electrical signals with the frequency of the acoustic signal from the drill bit and a phase relationship determined by the position of the drill bit relative to the reference line, means to multiplex the signals and to transmit the multiplexed signals to the surface, and means on the surface for comparing the phase relationship of the four signals and providing signals proportional to the phase angles of the signals, and indicating means responsive to the signals proportional to the difference in phase angles of the signals to indicate the position of the drill bit relative to the reference line.

2. The apparatus of claim 1 further provided with means for indicating when the microphones are in the desired position relative to the reference line.

3. The apparatus of claim 2 in which the microphones' position indicating means includes a free running multivibrator that includes a variable resistor as a coupling element, a pendulum, and means connecting the pendulum to the movable contact of the variable resistor to cause the time constants of the coupling elements to be unequal and vary from a fifty percent (50%) duty cycle when the microphone array is not in the desired position relative to the reference line.

4. A method of indicating the position of a drill bit relative to an underground target area, comprising the steps of transmitting an acoustic signal of preselected frequency from the drill bit into the ground, locating a microphone array in the underground target area with the microphones in a known orientation with respect to each other and to the desired direction of travel of the drill bit, when it reaches the target area, to detect the acoustic signal transmitted to the ground by the drill bit, transmitting the picked up signals to the surface, and comparing the phase relationship of selected pairs of said signals to determine the position of the drill bit relative to the target area.

5. Apparatus for indicating the position of a drill bit relative to a target point comprising means for generating a signal of a preselected frequency, means for transmitting said signal of a preselected frequency from the drill bit into the ground, a microphone array including a plurality of microphones positioned at the target area and oriented in a known position relative to each other, means providing signals proportional to the phase angles of the signals reaching the microphones, and means responsive to the phase angle proportional signals to indicate the position of the drill bit relative to the target area.

6. The apparatus of claim 5 in which the microphone array comprises four microphones located at the corners of an imaginary square.

7. The apparatus of claim 5 in which the microphones are oriented to be in a plane transverse to the desired line of travel of the drill bit when it reaches the target area.

8. The apparatus of claim 5 further provided with means for indicating at a remote location the orientation of the microphones with respect to a preselected plane after the microphones are positioned in the target area.

9. The apparatus of claim 5 in which the signals received by the microphones are time division multiplexed and transmitted from the target area through the same channel to the means for providing the signals proportional to the phase angle between the signals received by the microphones.

* * * * *